(12) United States Patent
Hsu et al.

(10) Patent No.: US 9,425,463 B2
(45) Date of Patent: Aug. 23, 2016

(54) METHOD OF FABRICATING ELECTRODES OF HIGH POWER-DENSITY FLOW CELL

(71) Applicant: Institute of Nuclear Energy Research, Atomic Energy Council, Executive Yuan, R.O.C., Taoyuan County (TW)

(72) Inventors: Ning-Yih Hsu, Keelung City (TW);
Yuan-Ming Chang, New Taipei (TW);
Kuan-Hsiang Chen, Taichung (TW);
Hwa-Jou Wei, Taoyuan County (TW);
Chen-Hao Wang, New Taipei (TW);
Wan-Min Huang, Taoyuan County (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 7 days.

(21) Appl. No.: 14/266,945

(22) Filed: May 1, 2014

(65) Prior Publication Data
US 2015/0114924 A1 Apr. 30, 2015

(30) Foreign Application Priority Data
Oct. 28, 2013 (TW) .............................. 102138977 A (51) Int. Cl.
| | |
|---|---|
| H01B 13/00 | (2006.01) |
| H01L 21/302 | (2006.01) |
| H01M 4/88 | (2006.01) |
| H01M 4/96 | (2006.01) |
| H01M 8/18 | (2006.01) |
| H01M 8/20 | (2006.01) |

(52) U.S. Cl.
CPC .......... *H01M 4/8817* (2013.01); *H01M 4/8867* (2013.01); *H01M 4/8875* (2013.01); *H01M 4/96* (2013.01); *H01M 8/188* (2013.01); *H01M 8/20* (2013.01); *Y02E 60/50* (2013.01)

(58) Field of Classification Search
CPC ................. H01L 21/76876; H01L 2221/1094; H01L 23/53276; B82Y 40/00; B82Y 30/00; Y02E 60/10; Y02E 60/12; C01B 31/0233; C01B 2202/02; B01J 19/126; B01J 37/349; B01J 37/18
USPC .......... 216/67, 69, 13, 17; 438/710, 715, 726, 438/727, 905; 156/345.29; 977/742, 843, 977/734, 842, 750, 890; 423/447.1, 448; 427/249.1, 113, 122, 301, 535, 569, 427/58, 79
See application file for complete search history.

(56) References Cited

U.S. PATENT DOCUMENTS

| | | | | |
|---|---|---|---|---|
| 6,509,119 | B1 * | 1/2003 | Kobayashi | ............. C01B 31/04 423/445 R |
| 2002/0085968 | A1 * | 7/2002 | Smalley et al. | ............... 422/198 |

(Continued)

OTHER PUBLICATIONS

Kim et al. ("The effects of surface modification on carbon felt electrodes for use in vanadium redox flow batteries", Materials Chemistry and Physics 131 (2011), p. 547-553).*

(Continued)

*Primary Examiner* — Nadine Norton
*Assistant Examiner* — Christopher Remavege
(74) *Attorney, Agent, or Firm* — Jackson IPG PLLC; Demian K. Jackson (57) ABSTRACT

A method is provided for producing electrodes of flow cell having high power density. A plurality of seeds are distributed on a surface of a conductive carbon material. The seeds are etched into nanoparticles to form carbon nanotube (CNT) electrodes. The present invention can be applied to vanadium redox flow cell with advantages of the CNT electrodes, such as conductivity, corrosion resistance, mechanical strength and specific and electrochemical surface area. Electrons are directly passed to the material through CNTs and then to an external electronic load for improving power density of flow cell, making a cell pack more compact and reducing energy consumption on charging and discharging without using noble metal material.

10 Claims, 7 Drawing Sheets

(56) References Cited

U.S. PATENT DOCUMENTS

| | | | |
|---|---|---|---|
| 2012/0220106 A1* | 8/2012 | Matsumoto et al. | 438/478 |
| 2014/0065447 A1* | 3/2014 | Liu et al. | 429/7 |
| 2015/0140436 A1* | 5/2015 | Gohier | 429/231.8 |

OTHER PUBLICATIONS

Chakrabarti et al. ("Application of carbon materials in redox flow batteries", Journal of Power Sciences 253 (2014), p. 150-166.).*

* cited by examiner

METHOD OF FABRICATING ELECTRODES OF HIGH POWER-DENSITY FLOW CELL

TECHNICAL FIELD OF THE INVENTION

The present invention relates to manufacturing electrodes; more particularly, relates to directly passing electrons to a conductive carbon material through carbon nanotubes (CNT) and then to an external electronic load for improving power density of flow cell, making a cell pack more compact and reducing energy consumption on charging and discharging without using noble metal material.

DESCRIPTION OF THE RELATED ART

Traditionally, for making electrodes of flow cell, finished conductive carbon nanotubes (CNT) are mixed with graphite, which thereby are used as electrodes for transferring electrons in the flow cell.

However, since the conductive CNTs are finished in advance, they cannot be directly formed on the surface of the graphite. As a result, conductive CNTs have bad contact with the graphite, where electrical conductivity, corrosion resistance, mechanical strength, specific surface area and electrochemical surface area are all poor. In addition, during the electrons are transferred through the electrodes, more energy may be needed.

Hence, the prior art does not fulfill all users' requests on actual use.

SUMMARY OF THE INVENTION

The main purpose of the present invention is to use CNT electrodes with advantages of their conductive properties, corrosion resistance, excellent mechanical strength, high specific surface area and electrochemical surface area to be used in vanadium redox flow-cell electrodes to directly pass electrons to a conductive carbon material through CNTs and then to an external electronic load for improving power density of flow cell, making cell pack more compact and reducing energy consumption on charging and discharging without using noble metal material.

To achieve the above purpose, the present invention is a method of fabricating electrodes of high power-density flow cell, comprising steps of: (a) pre-treatment: processing a high-temperature treatment to a conductive carbon material; (b) seed settlement: distributing a plurality of seeds on a surface of the conductive carbon material; (c) etching: etching each of the seeds on the surface of the conductive carbon material into a plurality of nanoparticles; and (d) microwave molding: forming a plurality of CNT electrodes on said surface of said conductive carbon material by directly microwaving said nanoparticles. Accordingly, a novel method of fabricating electrodes of high power-density flow cell is obtained.

BRIEF DESCRIPTIONS OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 7, which is a flow view showing a preferred embodiment according to the present invention; views showing steps of pre-treatment, seed settlement, etching and microwave molding; and a view showing forming of CNT electrodes on a surface of a conductive carbon material. As shown in the figure, the present invention is a method of fabricating electrodes of high power-density flow cell, comprising steps of pre-treatment 1, seed settlement 2, etching 3 and microwave molding 4. A chemical vapor deposition device assisted with microwave plasma (not shown) or other devices can be used for fabrication.

Figure 1:
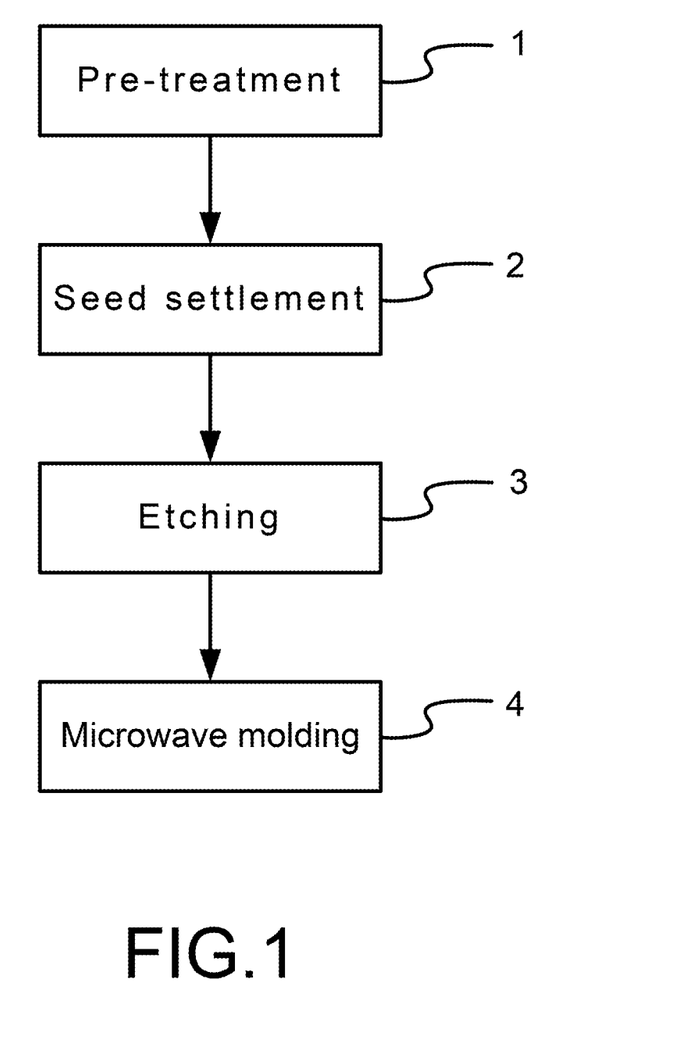
FIG. 1 is the flow view showing the preferred embodiment according to the present invention.
Figure 2:
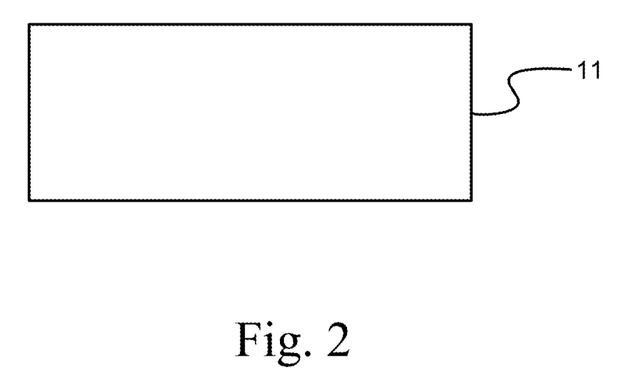
FIG. 2 is the view showing the step of pre-treatment.

(a) Pre-treatment 1: In FIG. 2, a conductive carbon material 11 is processed through a high-temperature treatment, where the conductive carbon material 11 is a carbon or graphite felt. On processing the pre-treatment, the conductive carbon material 11 is burnt at a temperature of 140 Celsius degrees (° C.)±20% for at least 10 hours in a furnace with oxygen introduced. Then, after being burnt, the conductive carbon material 11 is cooled down to a room temperature and, then, is heated up again to 500° C.±20% for processing a functionalization treatment. Or, impurities in the conductive carbon material 11 are removed with 8 mores (M) of nitric acid and 2M of sulfuric acid under a reflux condition.

Figure 3:
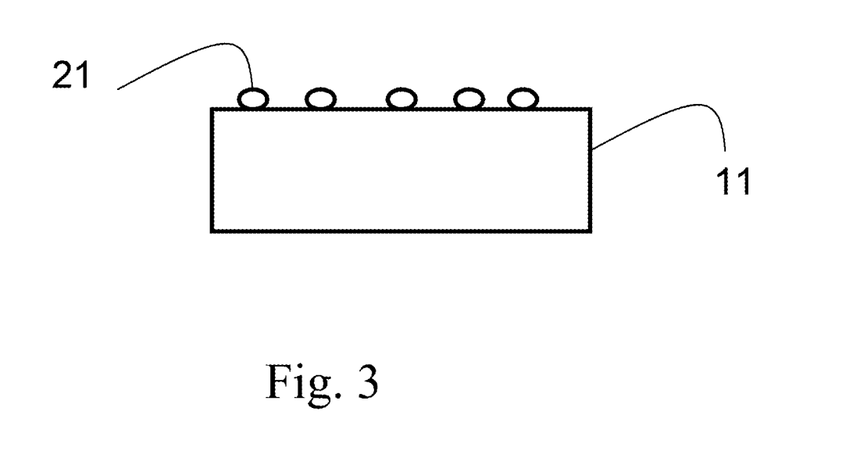
FIG. 3 is the view showing the step of seed settlement.

(b) Seed settlement 2: In FIG. 3, a plurality of seeds 21 are distributed on a surface of the conductive carbon material 11, where the seeds 21 are iron. On setting the seeds 21, a sol-gel method or an iron-bearing leaching method is used to distribute the seeds 21 on the surface of the conductive carbon material 11.

Figure 4:
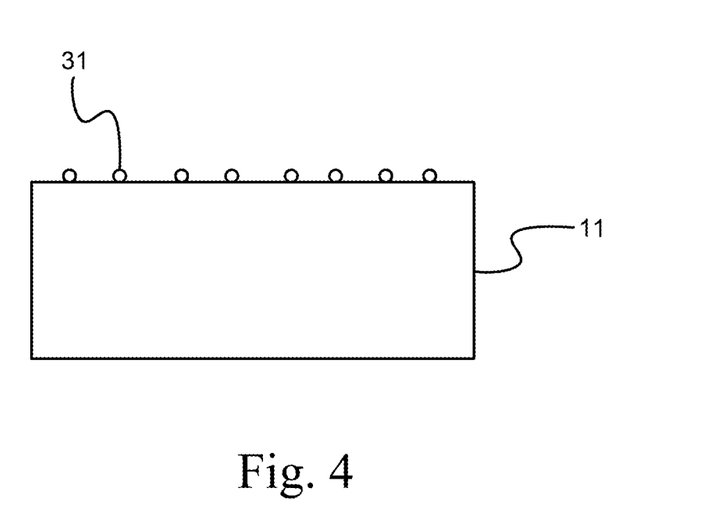
FIG. 4 is the view showing the step of etching.

(c) Etching 3: In FIG. 4, a hydrogen-plasma treatment is used to directly etch the seeds 21 on the surface of the conductive carbon material 11 into nanoparticles 31, where the nanoparticles 31 has a size less than 10 nanometers (nm).

Figure 5:
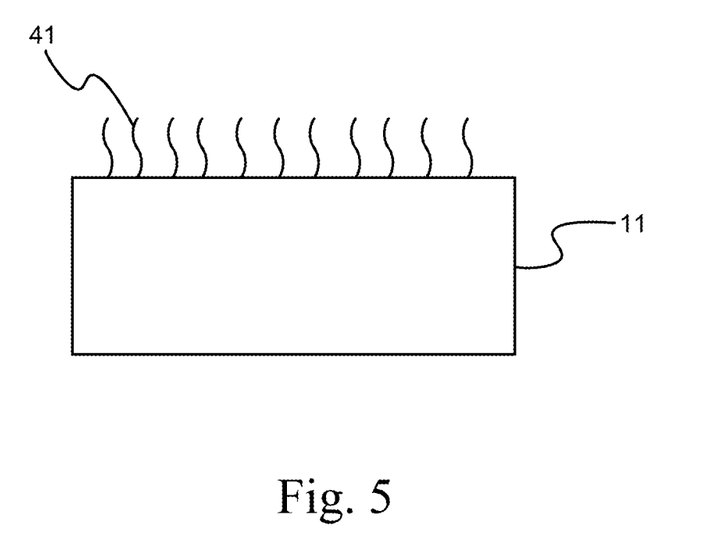
FIG. 5 and FIG. 6 are the views showing the step of microwave molding.
Figure 6:
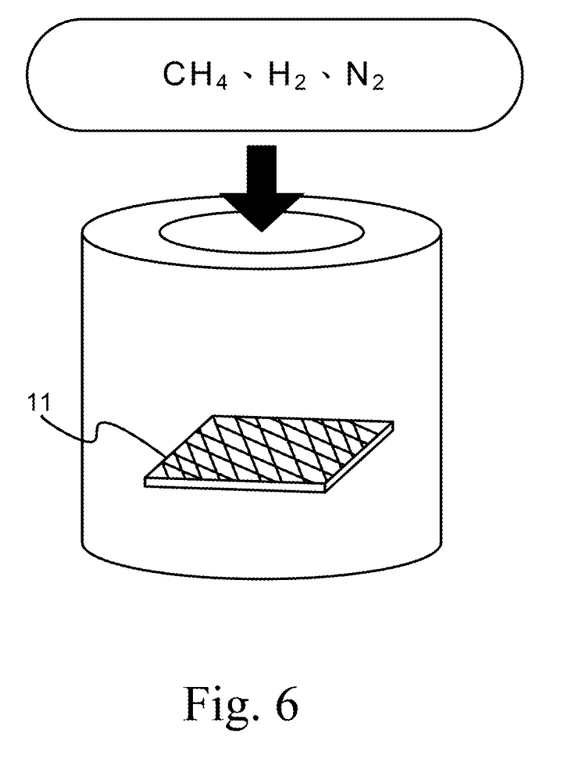
Figure 7:
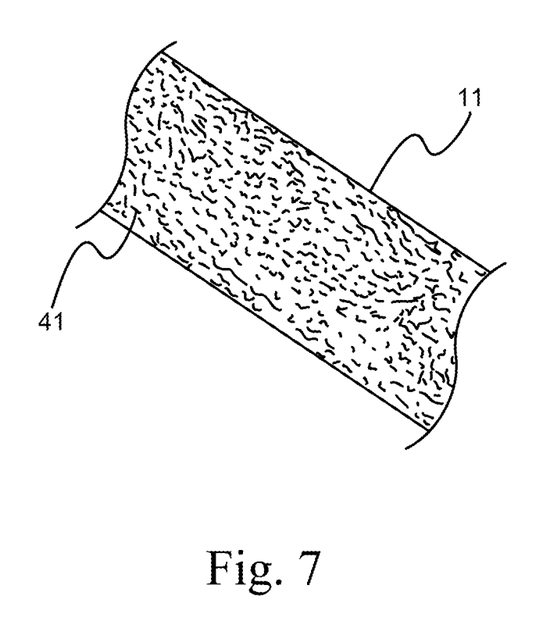
FIG. 7 is the view showing the forming of the CNT electrodes on the surface of the conductive carbon material.

(d) Microwave molding 4: In FIG. 5, FIG. 6 and FIG. 7, a chemical vapor deposition device assisted with microwave plasma is used to form multi-walled CNT electrodes 41 directly with the nanoparticles 31 on the surface of the conductive carbon material 11, where the diameter of each CNT electrode 41 is smaller than 50 nm±20% and the length of each CNT electrode 41 is about 1 micrometer (μm)±20%. When the microwave power of the device reaches 2500 watts (W), $CH_4$, $H_2$ and $N_2$ are introduced at flow rates of 20 standard cubic centimeters per minute (sccm), 80 sccm and 80 sccm, respectively, for 10 minutes to grow the CNT electrodes 41. During growing the CNT electrodes 41, the device is maintained at a pressure of 40 torrs±20% and a reaction temperature of 900° C.±20%.

To sum up, the present invention is a method of fabricating electrodes of high power-density flow cell, where the present invention can be applied to vanadium redox flow cell with advantages of CNT electrodes, such as conductivity, corrosion resistance, mechanical strength and specific and electrochemical surface areas; and where electrons are directly passed to a conductive carbon material through CNTs and then to an external electronic load for improving power density of flow cell, making a cell pack more compact and reducing energy consumption on charging and discharging without using noble metal material.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating electrodes of high power-density flow cell, comprising steps of:
   (a) pre-treatment: processing a first high-temperature treatment at a first elevated temperature to a conductive carbon material, then cooling the conductive carbon material to room temperature, then exposing the conductive carbon material to a second high-temperature treatment at a second, more elevated temperature;
   (b) seed settlement: distributing a plurality of seeds on a surface of said conductive carbon material;
   (c) etching: etching each of said seeds on said surface of said conductive carbon material into a plurality of nanoparticles; and
   (d) microwave molding: forming a plurality of carbon nanotube (CNT) electrodes on said surface of said conductive carbon material by introducing $CH_4$, $H_2$ and $N_2$ and directly microwaving said nanoparticles,
   wherein, in step (a), said first high-temperature treatment comprises exposing the carbon-based conductive material to a temperature of 140 Celsius degrees (° C.)±20% for at least 10 hours in a furnace with oxygen introduced.

2. The method according claim 1, wherein, in step (a), said conductive carbon material is selected from a group consisting of a carbon felt and a graphite felt.

3. The method according claim 1, wherein the second high-temperature treatment comprises exposing the conductive carbon material to 500° C.±20% and so as to process a functionalization treatment.

4. The method according claim 1, further comprising removing impurities in said conductive carbon material with 8 molar (M) nitric acid and 2M sulfuric acid under a reflux condition.

5. The method according claim 1, wherein, in step (b), said seeds are iron and said seeds are distributed on said surface of said conductive carbon material through a sol-gel or an iron-bearing leaching method.

6. The method according claim 1, wherein, in step (c), each of said seeds on said surface of said conductive carbon material is directly etched into said nanoparticle through a hydrogen-plasma treatment.

7. The method according claim 1, wherein, in step (d), a chemical vapor deposition device assisted with microwave plasma is used to directly form multi-walled CNT electrodes on said surface of said conductive carbon material directly with the nanoparticles.

8. The method according claim 7, wherein, when microwave power of said device reaches 2500 watts (W), $CH_4$, $H_2$ and $N_2$ are introduced at flow rates of 20 standard cubic centimeters per minute (sccm), 80 sccm and 80 sccm, respectively, for 10 minutes to grow said CNT electrodes; and wherein, during growing said CNT electrodes, said device is maintained at a pressure of 40 torrs±20% and a reaction temperature of 900° C.±20%.

9. The method according claim 1, wherein, in step (d), each of said CNT electrodes has a diameter less than 50 nanometers (nm)±20% and a length of 1 micrometer (μm)±20%.

10. A method of fabricating electrodes of high power-density flow cell, comprising steps of:
   (a) pre-treatment: processing a first high-temperature treatment at a first elevated temperature to a conductive carbon material, then cooling the conductive carbon material to room temperature, then exposing the conductive carbon material to a second high-temperature treatment at a second, more elevated temperature;
   (b) seed settlement: distributing a plurality of seeds on a surface of said conductive carbon material;
   (c) etching: etching each of said seeds on said surface of said conductive carbon material into a plurality of nanoparticles; and
   (d) microwave molding: forming a plurality of carbon nanotube (CNT) electrodes on said surface of said conductive carbon material by introducing $CH_4$, $H_2$ and $N_2$ and directly microwaving said nanoparticles,
   wherein, in step (d), a chemical vapor deposition device assisted with microwave plasma is used to directly form multi-walled CNT electrodes on said surface of said conductive carbon material directly with the nanoparticles,
   wherein, when microwave power of said device reaches 2500 watts (W), $CH_4$, $H_2$ and $N_2$ are introduced at flow rates of 20 standard cubic centimeters per minute (sccm), 80 sccm and 80 sccm, respectively, for 10 minutes to grow said CNT electrodes; and wherein, during growing said CNT electrodes, said device is maintained at a pressure of 40 torrs±20% and a reaction temperature of 900° C.±20%.

* * * * *